(12) United States Patent
Latva-Kokko et al.

(10) Patent No.: US 10,400,307 B2
(45) Date of Patent: Sep. 3, 2019

(54) METHOD AND SYSTEM FOR RECOVERY OF PRECIOUS METAL

(71) Applicant: OUTOTEC (FINLAND) OY, Espoo (FI)

(72) Inventors: Marko Latva-Kokko, Pori (FI); Jari Kourunen, Kuopio (FI)

(73) Assignee: OUTOTEC (FINLAND) OY, Espoo (FI)

( * ) Notice: Subject to any disclaimer, the term of this patent is extended or adjusted under 35 U.S.C. 154(b) by 0 days.

(21) Appl. No.: 16/181,411

(22) Filed: Nov. 6, 2018

(65) Prior Publication Data
US 2019/0071751 A1 Mar. 7, 2019

Related U.S. Application Data

(63) Continuation of application No. PCT/FI2016/050475, filed on Jun. 28, 2016.

(51) Int. Cl.
*C22B 3/00* (2006.01)
*B01J 47/14* (2017.01)
(Continued)

(52) U.S. Cl.
CPC .............. *C22B 11/04* (2013.01); *B01J 47/14* (2013.01); *C22B 3/02* (2013.01); *C22B 3/24* (2013.01); *Y02P 10/234* (2015.11)

(58) Field of Classification Search
CPC ........... C22B 3/04; C22B 3/045; C22B 11/04; C25C 1/20; B01D 15/02; B01D 15/00;
(Continued)

(56) References Cited

U.S. PATENT DOCUMENTS

2010/0326920 A1  12/2010  Cutler et al.

FOREIGN PATENT DOCUMENTS

| DE | 2605811 | A | * | 8/1976 | |
| GB | 714642 | A | * | 9/1954 | .............. B01J 47/14 |
| JP | S5730554 | A | * | 2/1982 | |

OTHER PUBLICATIONS

DE 2605811 A, Patent family and machine translation for FR 2300612 (Year: 1976).*

(Continued)

*Primary Examiner* — Tima M. McGuthry-Banks
(74) *Attorney, Agent, or Firm* — Robert P. Michal, Esq.; Carter, DeLuca & Farrell LLP

(57) ABSTRACT

A method and to an arrangement for recovery of precious metal. The method includes calculating a first electrical property of a slurry downstream of a retention screen in a first flow direction A either (i) based on a first difference between the first supplied current and the first received voltage, or (ii) based on a first difference between the first supplied voltage and the first received current, calculating a second electrical property of the slurry upstream of the retention screen either (i) based on a second difference between the second supplied current and the second received voltage, or (ii) based on a second difference between the second supplied voltage and the second received current, and calculating the adsorption particle content of the slurry upstream of the retention screen based on a difference between the first and the second electrical property.

18 Claims, 9 Drawing Sheets

(51) Int. Cl.
    *C22B 3/02*    (2006.01)
    *C22B 3/24*    (2006.01)
(58) Field of Classification Search
    CPC ............... B01J 19/0006; B01J 19/0033; B01J 2208/00008; B01J 47/14
    See application file for complete search history.

(56) References Cited

OTHER PUBLICATIONS

JP H0125618 B2 patent family and machine translation for JP S5730554 (Year: 1989).*
International Search Report issued by the European Patent Office acting as the International Searching Authority in relation to International Application No. PCT/FI2016/050475 dated Feb. 8, 2017 (3 pages).
Written Opinion of the International Searching Authority issued by the European Patent Office acting as the International Searching Authority in relation to International Application No. PCT/FI2016/050475 dated Feb. 8, 2017 (6 pages).

* cited by examiner

METHOD AND SYSTEM FOR RECOVERY OF PRECIOUS METAL

CROSS-REFERENCE TO RELATED APPLICATIONS

This application is a continuation of PCT International Application No. PCT/FI2016/050475 filed Jun. 28, 2016, the disclosure of this application is expressly incorporated herein by reference in its entirety.

FIELD

The present invention generally relates to a system and method for the recovery of precious metal such as gold or silver by means of adsorption particles in pulp or by means of adsorption particles in leach. Examples of such processes are carbon-in-pulp (CIP), carbon-in-leach (CIL), resin-in-leach (RIL), and resin-in-pulp (RIP) processes.

In a CIL/CIP/RIL/RIP process, one key performance indicator of good performance is a low soluble precious metal loss. The usual target for gold solution loss is less than 0.01 mg/l, although the industrial average is more typically 0.02 to 0.3 mg/l. As gold ore grades being treated continue to drop, soluble gold loss represents an increasing loss in percentage recovery.

Minimizing soluble precious metal solution loss requires that adsorption particle management is optimized. Adsorption particle management comprises two key components; the quality of the adsorption particles (in particular its kinetic activity following regeneration) and the adsorption particle inventory (quality of adsorption particles, adsorption particle movement, and adsorption particle distribution in the circuit). Adsorption particle management in the circuit is often less than ideal due to infrequent measurement of adsorption particle concentration in the adsorption vessels, and manual control of adsorption particle movement between adsorption vessels.

OBJECTIVE

An object of the present invention is to provide a method and a system for recovery of precious metal, which method and system have improved adsorption particle measurement.

LIST OF FIGURES

Figure 1:
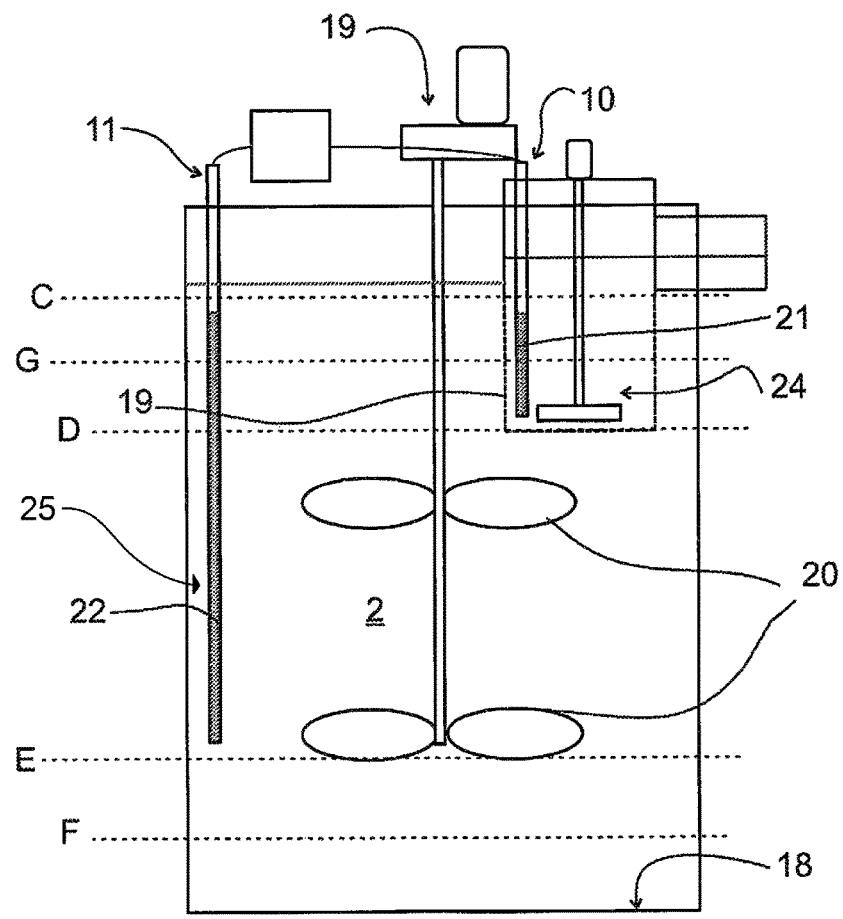
Figure 2:
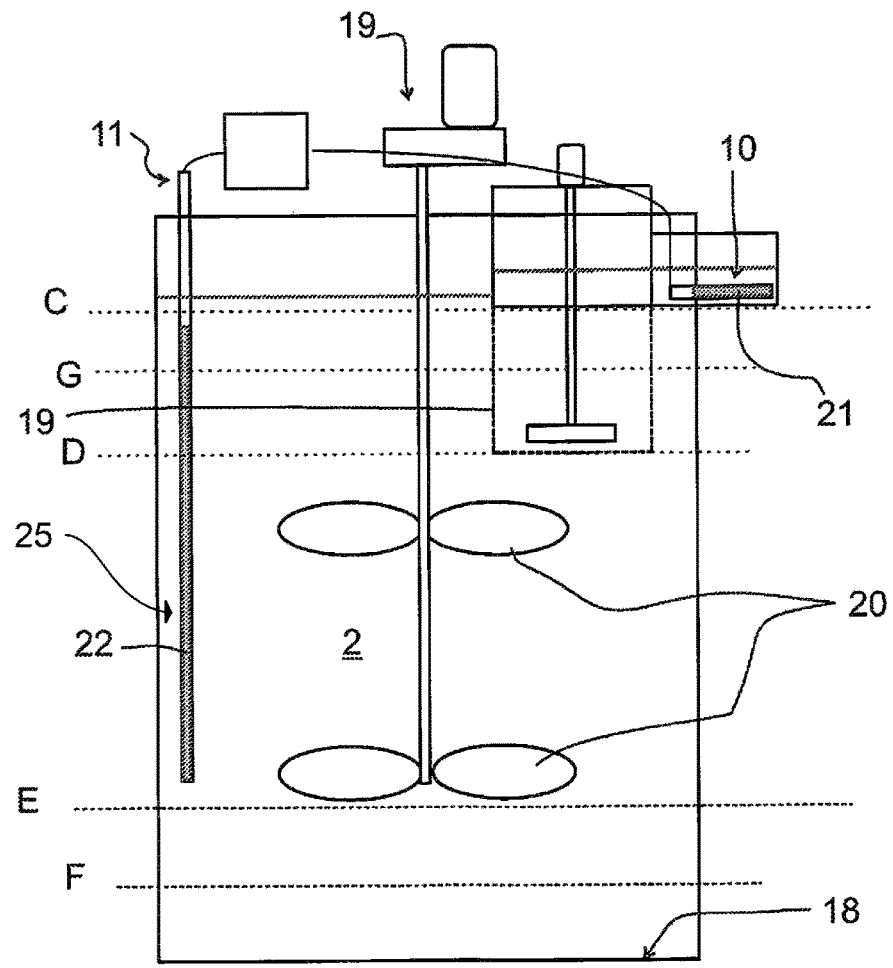
Figure 3:
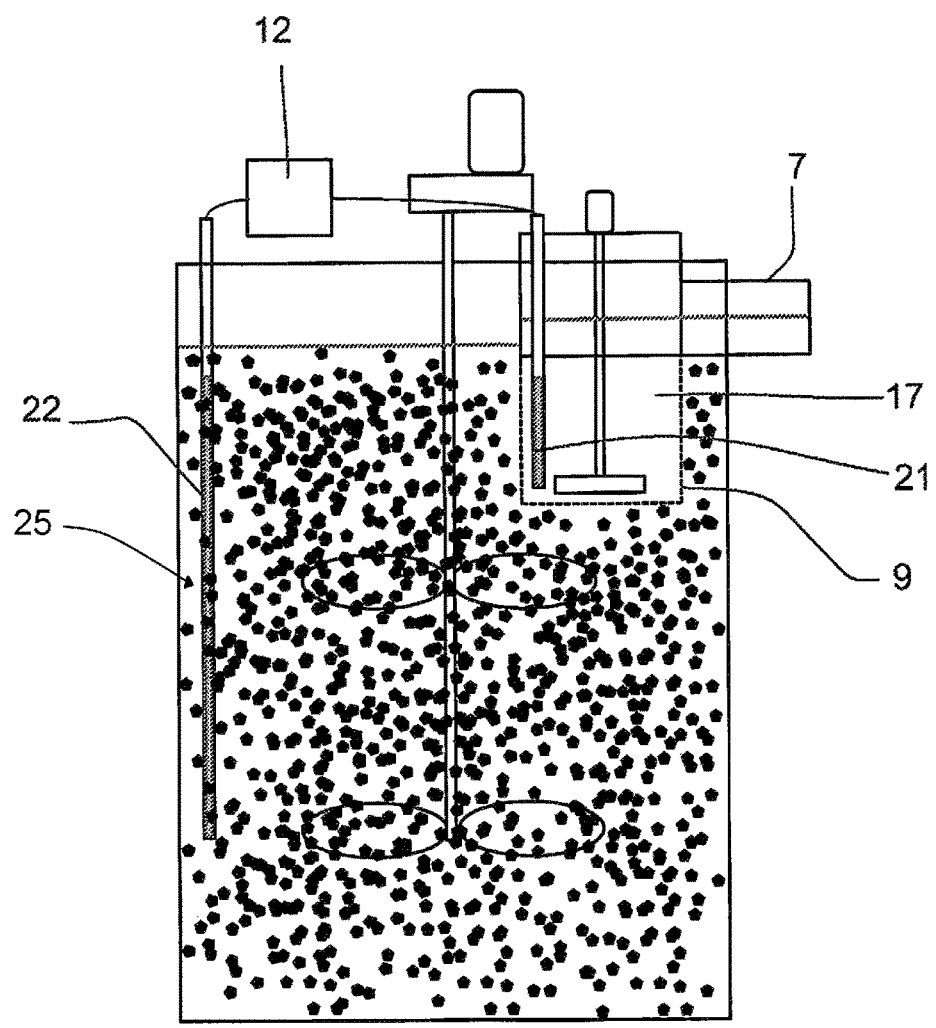
Figure 4:
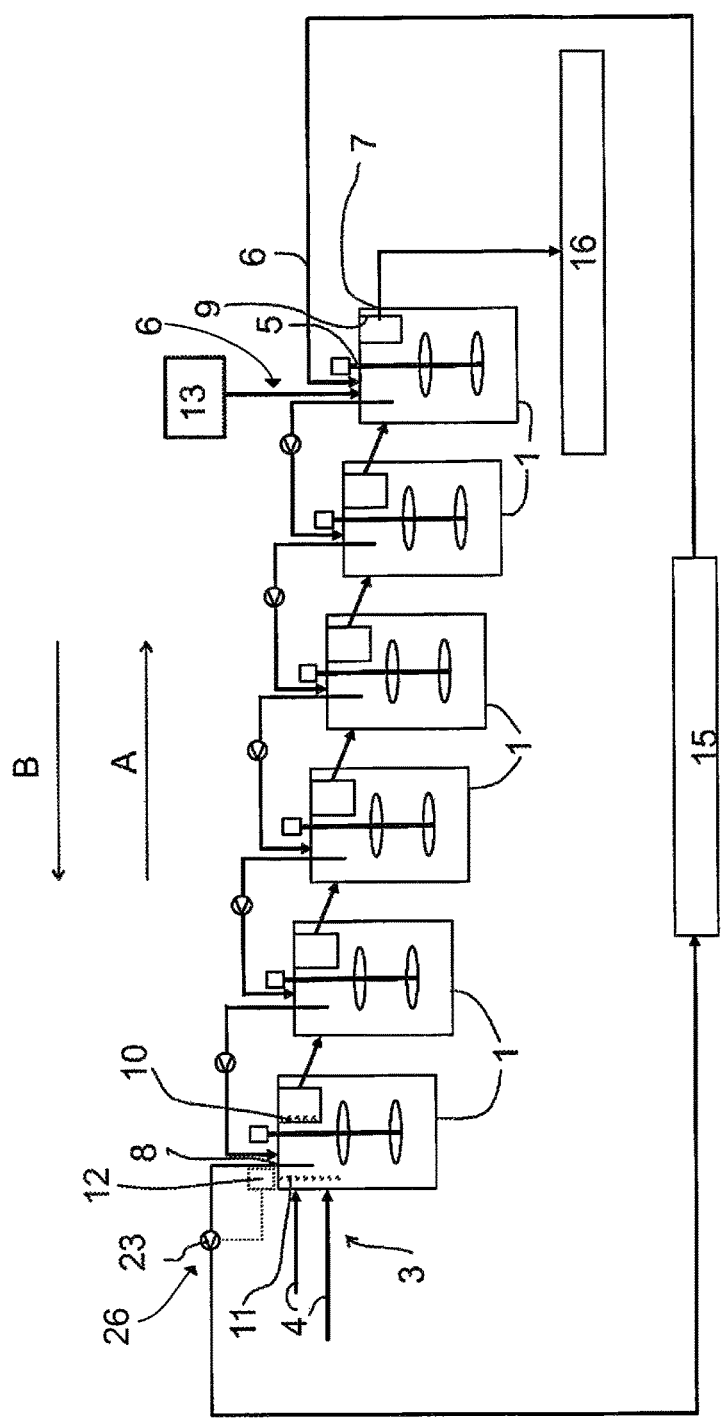
Figure 5:
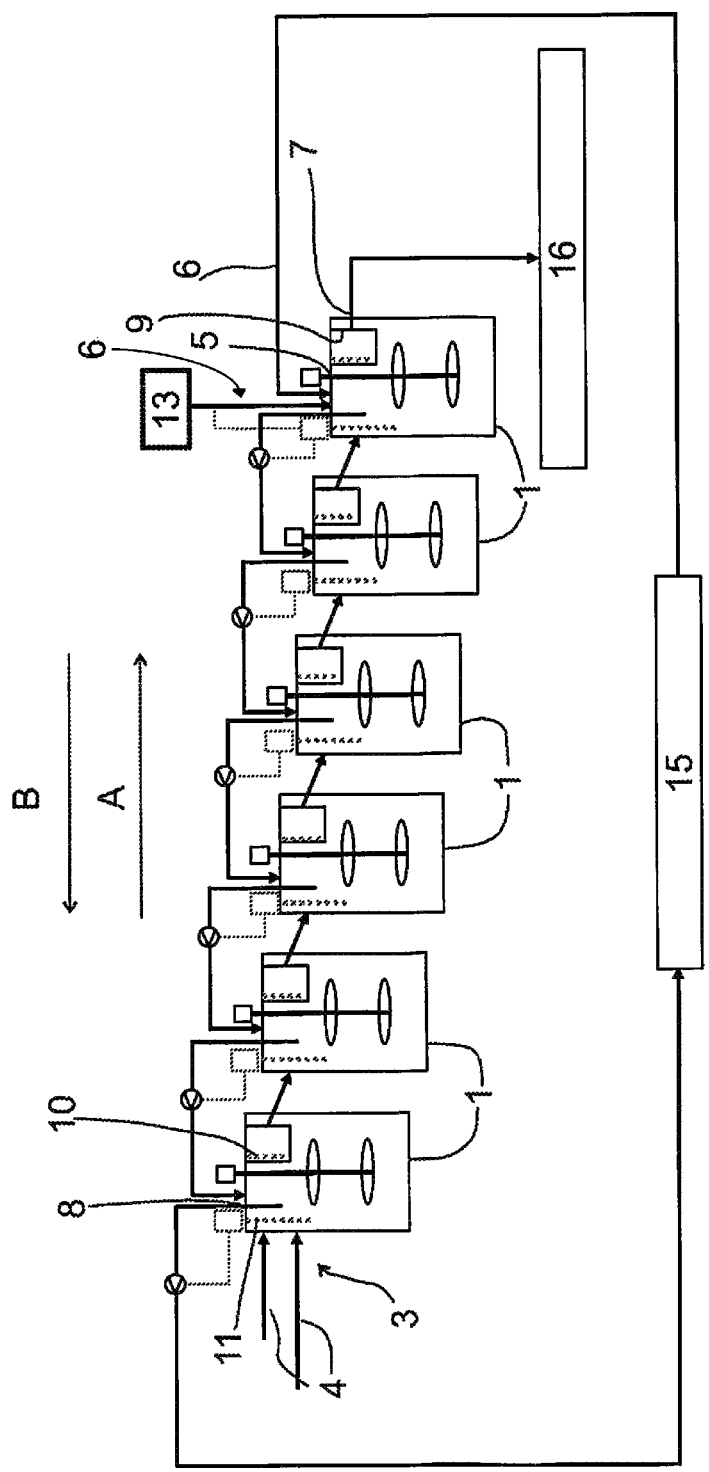
Figure 6:
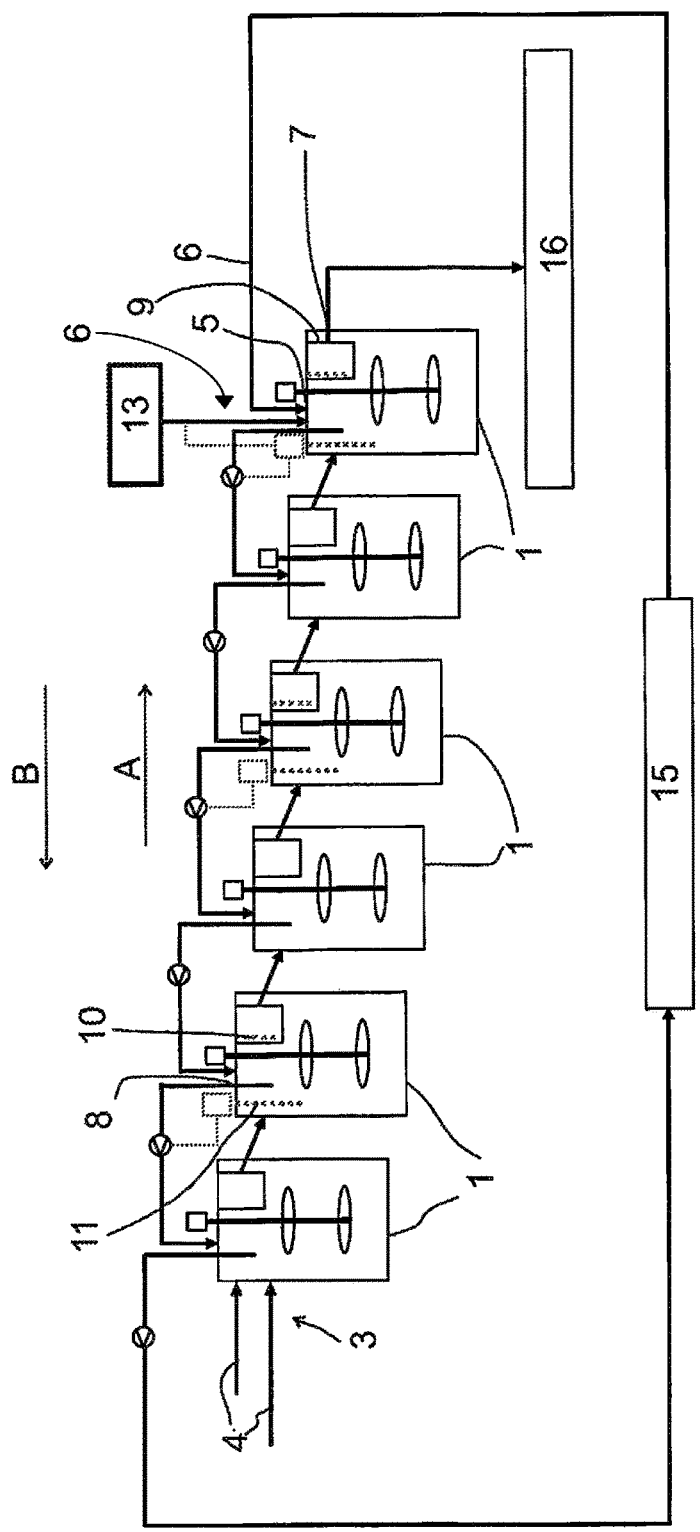
Figure 7:
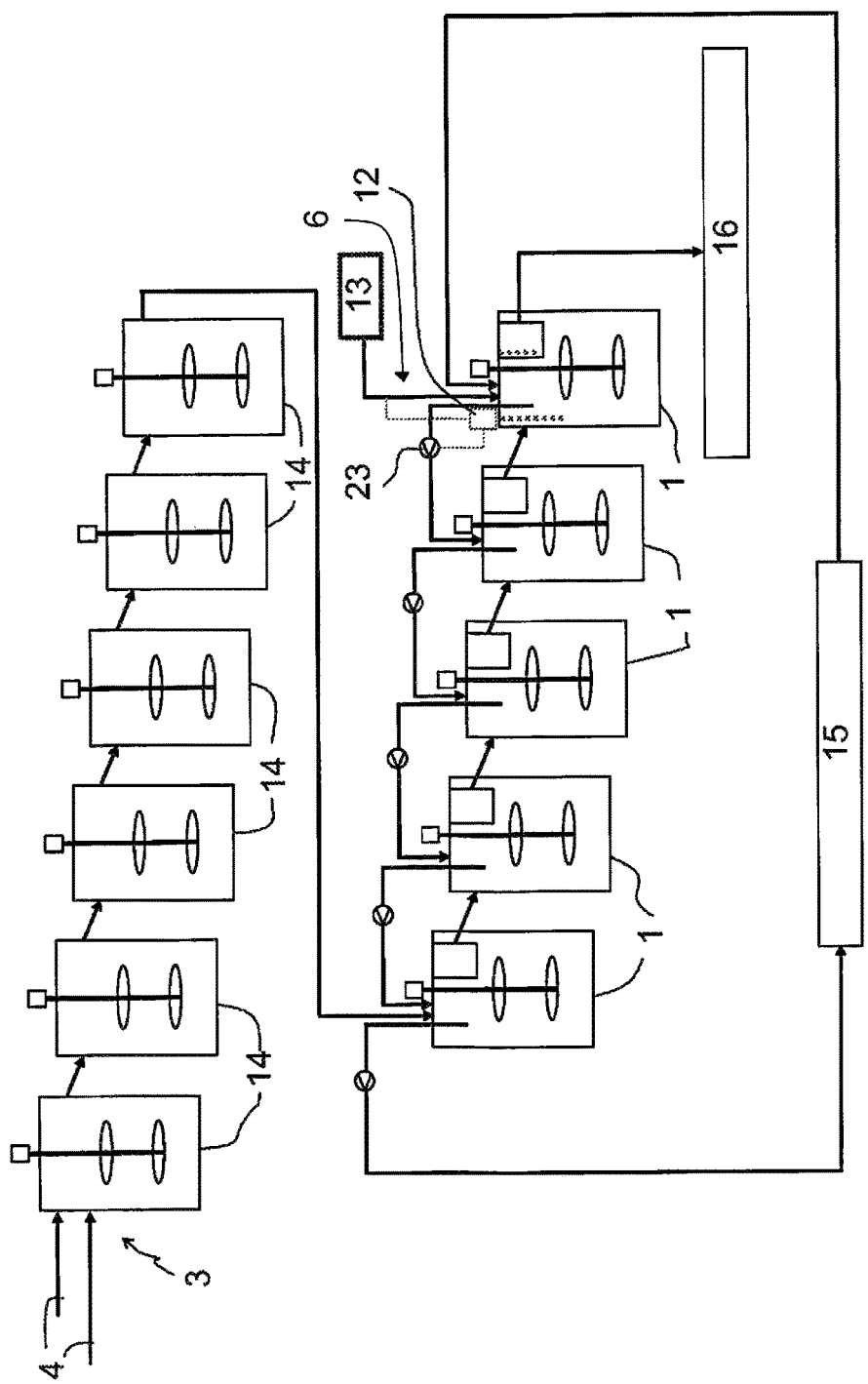
Figure 8:
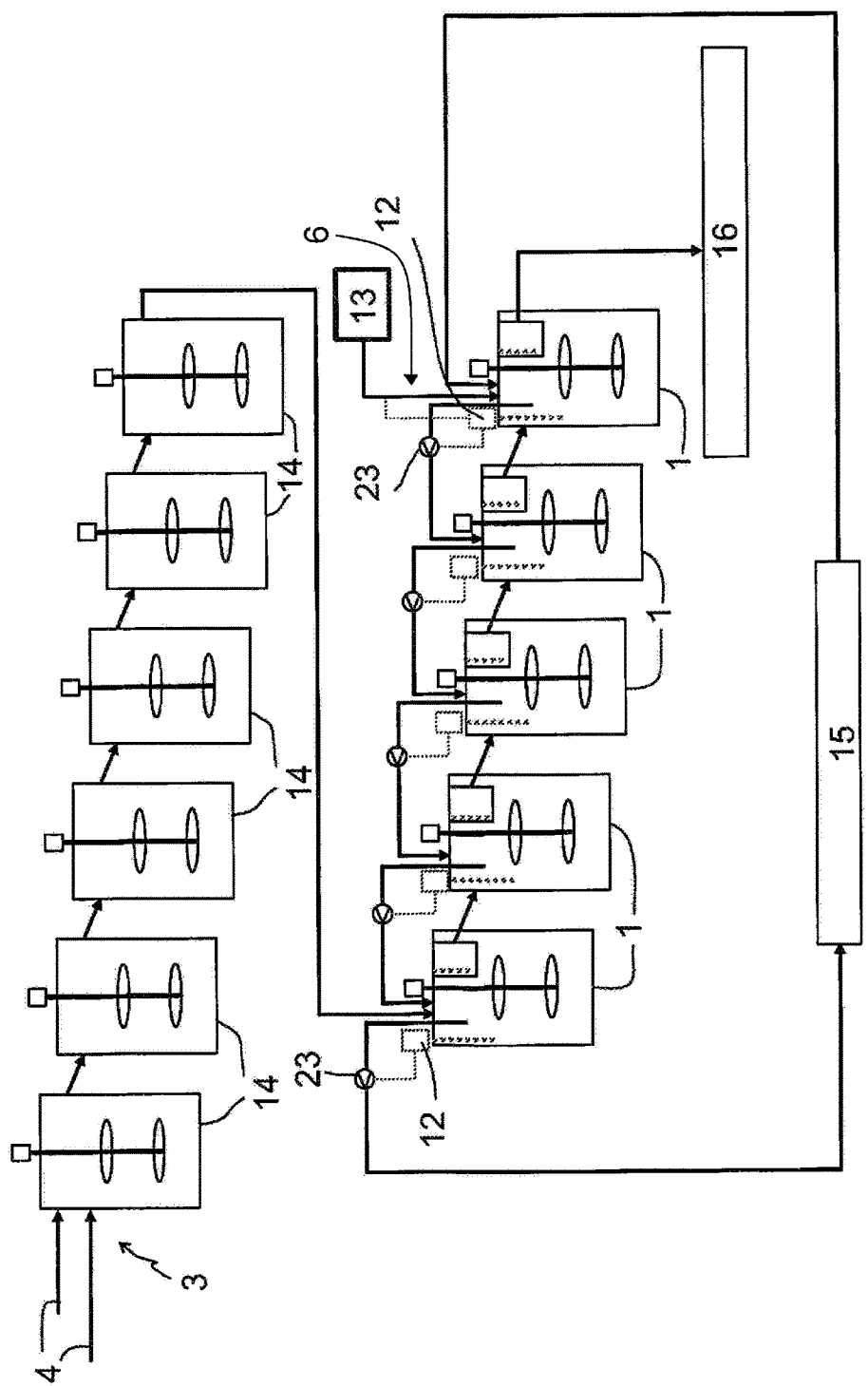
Figure 9:
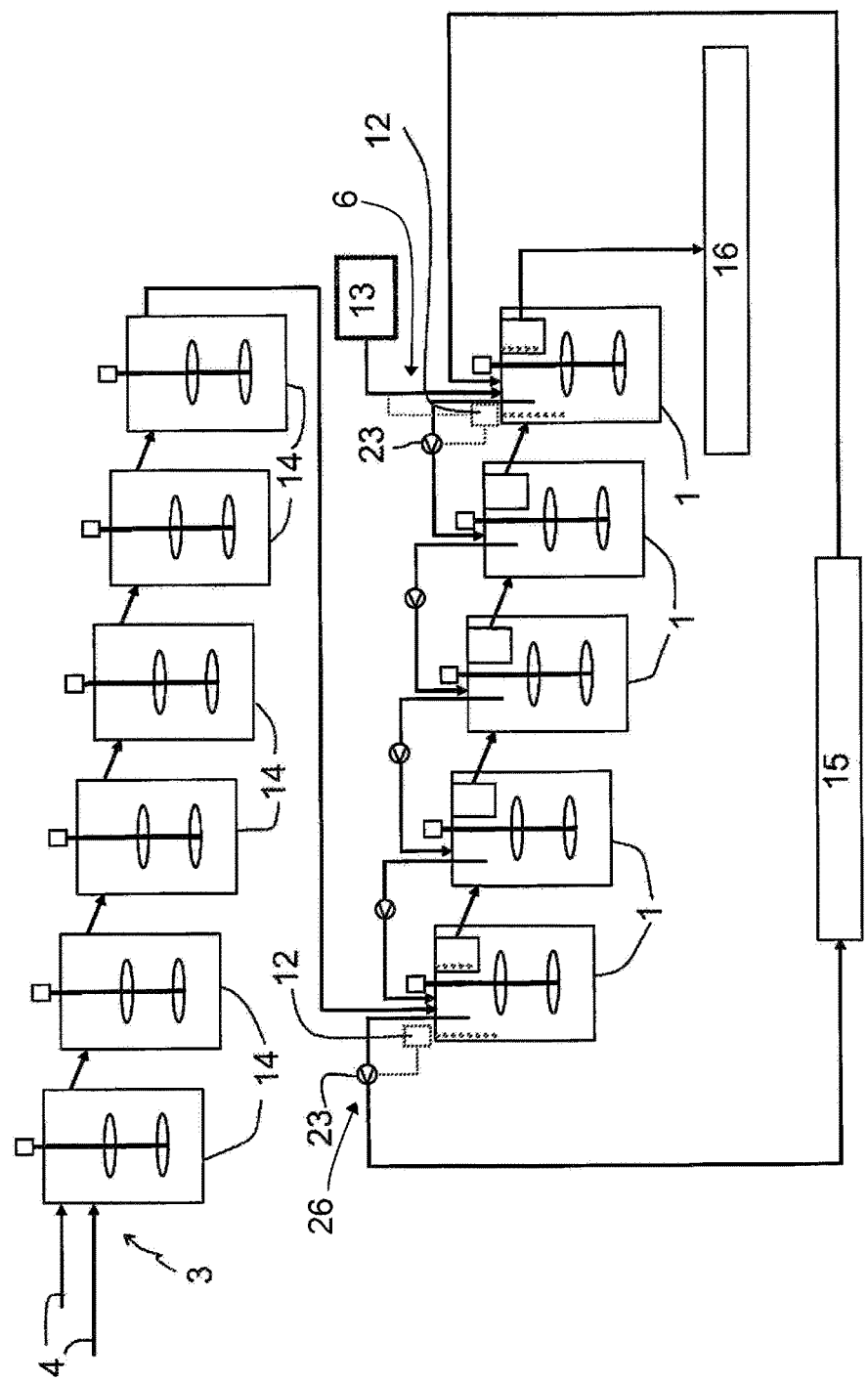

In the following the invention will described in more detail by referring to the figures, of which FIG. 1 shows one possible arrangement of the first probe and the second probe in an adsorption vessel, FIG. 2 shows another possible arrangement of the first probe and the second probe in an adsorption vessel, FIG. 3 illustrates adsorption particle distribution in an adsorption vessel, FIG. 4 is a flow sheet of first embodiment of the method and of the system, FIG. 5 is a flow sheet of second embodiment of the method and of the system, FIG. 6 is a flow sheet of third embodiment of the method and of the system, FIG. 7 is a flow sheet of fourth embodiment of the method and of the system, FIG. 8 is a flow sheet of fifth embodiment of the method and of the system, and FIG. 9 is a flow sheet of sixth embodiment of the method and of the system.

DETAILED DESCRIPTION OF THE INVENTION

First the method for recovery of precious metal and some variants and embodiments of the method will be described in greater detail.

The method comprises arranging a plurality of adsorption vessels 1 in series so that fluid can be conducted through said plurality of adsorption vessels 1 in series.

Each adsorption vessel 1 comprises a reactor space 2, a closed retention space 17 at least partly within the reactor space 2, and a retention screen 9 between the reactor space 2 and the closed retention space 17.

Each adsorption vessel 1 comprises first inlet means 3 for feeding slurry 4 containing precious metal into the reactor space 2.

Each adsorption vessel 1 comprises second inlet means 5 for feeding adsorption particles 6 into the reactor space 2.

Each adsorption vessel 1 comprises first outlet means 7 for feeding slurry 4 containing precious metal from the closed retention space 17.

Each adsorption vessel 1 second outlet means 8 for feeding adsorption particles 6 from the reactor space 2.

The method comprises feeding slurry 4 containing precious metal such as gold and/or silver into the reactor space 2 of each adsorption vessel 1.

The method comprises feeding adsorption particles 6 into the reactor space 2 of each adsorption vessel 1, wherein precious metals are adsorbed onto the adsorption particles 6.

The method comprises moving the slurry 4 through the plurality of adsorption vessels 1 with a first drive system 25 in a first flow direction A so that the slurry 4 moves through the retention screen 9 in the reactor space 2 of at least one adsorption vessel 1 of said plurality of adsorption vessels 1 into the closed retention space 17 of said at least one adsorption vessel 1, wherein the adsorption particles 6 cannot pass through the retention screen 9 whereas the slurry 4 passes through the retention screen 9.

The method comprises moving the adsorption particles 6 with a second drive system 26 through the plurality of adsorption vessels 1 in a second flow direction B that is opposite the first direction, The method comprises arranging in said at least one adsorption vessel 1 of said plurality of adsorption vessels 1 first electrodes 21 of a first probe 10 in electrical contact with the slurry 4 downstream of the retention screen 9 in the first flow direction A.

The method comprises a first measurement step for either (i) supplying with first electrodes 21 of the first probe 10 a first supplied voltage to the slurry 4 downstream of the retention screen 9 in the first flow direction A and receiving with first electrodes 21 of the first probe 10 a first received current from the slurry 4 downstream of the retention screen 9 in the first flow direction A, or (ii) supplying with first electrodes 21 of the first probe 10 a first supplied current to the slurry 4 downstream of the retention screen 9 in the first flow direction A and receiving with first electrodes 21 of the first probe 10 a first received voltage from the slurry 4 downstream of the retention screen 9 in the first flow direction A.

The method comprises arranging in said at least one adsorption vessel 1 of said plurality of adsorption vessels 1 second electrodes 22 of a second probe 11 in electrical contact with the slurry 4 upstream of the retention screen 9 in the first flow direction A.

The method comprises a second measurement step for either (i) supplying with the second electrodes 22 of the second probe 11 a second supplied voltage to the slurry 4 upstream of the retention screen 9 in the first flow direction A and receiving with the second electrodes 22 of the second probe 11 a second received current from the slurry 4 upstream of the retention screen 9 in the first flow direction A, or (ii) supplying with the second electrodes 22 of the second probe 11 a second supplied current to the slurry 4 upstream of the retention screen 9 in the first flow direction A and receiving with the second electrodes 22 of the second probe 11 a second received voltage from the slurry 4 upstream of the retention screen 9 in the first flow direction A.

The method comprises functionally connecting a data processor device 12 with the first probe 10 and with the second probe 11.

The method comprises calculating with the data processor device 12 a first electrical property of the slurry 4 downstream of the retention screen 9 in the first flow direction A, depending on what is supplied and what is received, either (i) based on a first difference between the first supplied current and the first received voltage, or (ii) based on a first difference between the first supplied voltage and the first received current.

The method comprises calculating with the data processor device 12 a second electrical property of the slurry 4 upstream of the retention screen 9 in the first flow direction A, depending on what is supplied and what is received, either (i) based on a second difference between the second supplied current and the second received voltage, or (ii) based on a second difference between the second supplied voltage and the second received current.

The method comprises calculating with the data processor device 12 the adsorption particle content of the slurry 4 upstream of the retention screen 9 in the first flow direction A based on a difference between the first electrical property and the second electrical property.

An embodiment of the method includes connecting the data processor device 12 to a source 13 of adsorption particles 6, and controlling the source 13 of adsorption particles 6 with the data processor device 12 in response to the calculated adsorption particle content. An advantage of this is that the absorption particle content can automatically or manually be adjusted as a result of the calculated adsorption particle content. In this embodiment of the method the source of adsorption particles 6 is preferably, but not necessarily, connected in fluid connection with the first adsorption vessel 1 of said plurality of adsorption vessels 1 in the second flow direction B. An advantage of this is that adsorption particles can be fed into all adsorption vessels 1 of said plurality of adsorption vessels 1 arranged in series from one source 13 of adsorption particles 6. It is also possible that a source 13 of adsorption particles 6 is in fluid connection with more than one or all adsorption vessels 1 of said plurality of adsorption vessels 1.

An embodiment of the method includes connecting the data processor device 12 to the second drive system 26, and controlling the second drive system 26 with the data processor device 12 in response to the calculated adsorption particle content. An advantage of this is that the absorption particle content can automatically or manually be adjusted as a result of the calculated adsorption particle content by adjusting the flow in the second flow direction B. In this embodiment of the method, the second drive system 26 comprises preferably, but not necessarily, a pump means 23 arranged in the second flow direction B downstream of each absorption vessels 1 of said plurality of adsorption vessels 1 arranged in series, and the method comprises controlling at least one pump means 23 of the second drive system 26 with the data processor device 12 in response to the calculated adsorption particle content.

An embodiment of the method includes connecting the data processor device 12 to the first drive system 25, and controlling the first drive system 25 with the data processor device 12 in response to the calculated adsorption particle content. An advantage of this is that the absorption particle content can automatically or manually be adjusted as a result of the calculated adsorption particle content by adjusting the flow in the first flow direction A. In this embodiment of the method, the first drive system 25 comprises preferably, but not necessarily, a lifting pump means 24 arranged in the retention space 17 of each absorption vessels 1 of said plurality of adsorption vessels 1 arranged in series, wherein the lifting pump is configured to move slurry in the first flow direction A towards the first outlet means 1 of each adsorption vessel 1, and the method comprises controlling at least one lifting pump means 24 of the first drive system 25 with the data processor device 12 in response to the calculated adsorption particle content.

The method can, as in the embodiments illustrated in FIGS. 7 to 9, include arranging a plurality of leaching reactors 14 in series, connecting said plurality of leaching reactors 14 arranged in series in fluid connection with the first inlet means 3 of the first adsorption vessel 1 of said plurality of adsorption vessels 1 in the first flow direction A, and feeding slurry 4 containing precious metal with said plurality of leaching reactors 14 arranged in series into the reactor space 2 of the first adsorption vessel 1 of said plurality of adsorption vessels 1 in the first flow direction A. In other words, the method can for example be a so-called carbon-in-leach (CIL) method or a so-called resin-in-leach (RIL) method, as shown in FIGS. 4 to 6, or a carbon-in-pulp (CIP) or resin-in-leach (RIP) method, as shown in FIGS. 7 to 9.

The method can include providing a stripping arrangement 15 for stripping precious metal from adsorption particles 6, and include connecting the stripping arrangement 15 for stripping precious metal from adsorption particles 6 in fluid connection with the first outlet means 7 of the last adsorption vessel 1 of said plurality of adsorption vessels 1 in the second flow direction B and in fluid connection with the second inlet means 5 of the first adsorption vessel 1 of said plurality of adsorption vessels 1 in the second flow direction B.

The method can include providing a slurry treating arrangement 16 for treating slurry 4 containing metal, and include connecting the slurry treating arrangement 16 for treating slurry 4 containing metal in fluid connection with the first outlet means 7 of the last adsorption vessel 1 of said plurality of adsorption vessels 1 in the first flow direction A.

In the method, the slurry 4 may contain additionally leaching agent such as cyanide, chloride, thiosulfate, and glycine, and additionally liquid such as water.

In the method, the adsorption particles 6 can comprise carbon such as activated carbon or ion exchange resin.

In the method, the adsorption particles 6 can be suspended in liquid such as in water.

In the method, the retention screen 9 extends preferably, but not necessarily, between a first horizontal level C in the reactor space 2 and a second horizontal level D in the reactor space 2, which second horizontal level D is vertically below the first horizontal level C, whereby the method comprises preferably, but not necessarily, arranging the second electrodes 22 of the second probe 11 below the first horizontal level C. An advantage of this is that the second electrodes will be arranged distanced from the surface of the content in the reactor space 2. Air content at the surface in the reactor space tis usually higher than elsewhere in the tank, which causes mistakes in the measuring. The method comprises more preferably arranging the second electrodes 22 of the second probe 11 below a fifth horizontal level G that is half-way between the first horizontal level C and the second horizontal level D.

The method comprises preferably, but not necessarily, arranging the second electrodes 22 of the second probe 11 at a distance from a bottom 18 of the reactor space 2. An advantage of this is that the particle content is typically higher at the bottom 18, which leads to mistakes in measuring.

In the method, a mixer 19 can be arranged in the reactor space 2 so that rotatable mixing means 20 of the mixer 19 are arranged above a third horizontal level E in the reactor space 2, which third horizontal level E is at a distance above a bottom 18 of the reactor space 2, whereby the method comprises preferably, but not necessarily, arranging the second electrodes 22 of the second probe 11 above a fourth horizontal level F that is half-way between the bottom 18 and the third horizontal level E. An advantage of this is that the particle content is normally higher at the bottom, which leads to mistakes in measuring. The method comprises more preferably, but not necessarily, arranging the second electrodes 22 of the second probe 11 above the third horizontal level E.

In the method, the slurry 4 containing precious metal can contain precious metal in dissolved form. Alternatively, or additionally, the method can comprise a dissolving step for dissolving precious metal contained in the slurry 4 containing precious metal to form precious metal in dissolved form.

In the method, first supplied voltage or first supplied current is preferably, but not necessarily, supplied and first received voltage or first received current is preferably, but not necessarily, received in the in the first measurement step continuously for a time period between 10 s and 5 min.

In the method, by second supplied voltage or second supplied current is preferably, but not necessarily, supplied and second received voltage or second received current is preferably, but not necessarily, received in the in the second measurement step continuously for a time period between 10 s and 5 min.

Next the system for recovery of precious metal and some variants and embodiments of the system will be described in greater detail.

The system comprises a plurality of adsorption vessels 1 arranged in series.

Each adsorption vessel 1 comprises a reactor space 2, a closed retention space 17 within the reactor space, and a retention screen 9 between the reactor space 2 and the closed retention space 17.

Each adsorption vessel 1 comprises first inlet means 3 for feeding slurry 4 containing precious metal into the reactor space 2, second inlet means 5 for feeding adsorption particles 6 into the reactor space 2, first outlet means 7 for feeding slurry 4 containing precious metal from the closed retention space 17, and second outlet means 8 for feeding adsorption particles 6 from the reactor space 2.

The system comprises slurry 4 containing precious metal in the reactor space 2 of each adsorption vessel 1.

The system comprises adsorption particles 6 in the reactor space 2 of each adsorption vessel 1 wherein the precious metals are adsorbed onto the adsorption particles 6.

The system comprises a first drive system 25 for moving the slurry 4 through the plurality of adsorption vessels 1 in a first flow direction A so that the slurry 4 moves through the retention screen 9 in the reactor space 2 of each adsorption vessel 1, wherein the adsorption particles 6 cannot pass through the retention screen 9 whereas the slurry 4 passes through the retention screen 9.

The first drive system 25 can comprise a lifting pump means 24 in the retention space 17 of each adsorption vessel 17 so that the mixer is configured to move slurry towards the first outlet means 7 of each adsorption vessel 1. In the first drive system 25, slurry can be configured to move from the first outlet means 7 of an adsorption vessel 1 to the first inlet means 3 of an adjacent adsorption vessel 1 in said plurality of adsorption vessels 1 arranged in series by means of gravity.

The system comprises a second drive system 26 for moving the adsorption particles 6 through the plurality of adsorption vessels 1 in a second flow direction B that is opposite the first direction.

The second drive system 26 can comprise a pump means 23 between two adjacent adsorption vessels 1 in said plurality of adsorption vessels 1 arranged in series.

The system comprises in at least one adsorption vessel 1 of said plurality of adsorption vessels 1 first electrodes 21 of a first probe 10 in electrical contact with the slurry 4 downstream of the retention screen 9 in the first flow direction A The first electrodes 21 of the first probe 10 are either (i) configured to supply a first supplied voltage to the slurry 4 downstream of the retention screen 9 in the first flow direction A, and configured to receive a first received current from the slurry 4 downstream of the retention screen 9 in the first flow direction A, or (ii) configured to supply a first supplied current to the slurry 4 downstream of the retention screen 9 in the first flow direction A, and configured to receive a first received voltage from the slurry 4 downstream of the retention screen 9 in the first flow direction A.

The system comprises in said at least one adsorption vessel 1 of said plurality of adsorption vessels 1 second electrodes 22 of a second probe 11 in electrical contact with the slurry 4 upstream of the retention screen 9 in the first flow direction A.

The second electrodes 22 of the second probe 11 are either (i) configured to supply a second supplied voltage to the slurry 4 upstream of the retention screen 9 in the first flow direction A, and configured to receive a second received current from the slurry 4 upstream of the retention screen 9 in the first flow direction A, or (ii) configured to supply a second supplied current to the slurry 4 upstream of the retention screen 9 in the first flow direction A, and configured to receive a second received voltage from the slurry 4 upstream of the retention screen 9 in the first flow direction A.

The system comprises a data processor device 12 functionally connected with the first probe 10 and with the second probe 11.

The data processor device 12 is configured either (i) to calculate a first electrical property of the slurry 4 downstream of the retention screen 9 in the first flow direction A based on a first difference between the first supplied voltage and the first received current or (ii) to calculate a first electrical property of the slurry 4 downstream of the retention screen 9 in the first flow direction A based on a first difference between the first supplied current and the first received voltage, whichever data is available.

The data processor device 12 is configured either (i) to calculate a second electrical property of the slurry 4 upstream of the retention screen 9 in the first flow direction A based on a second difference between the second supplied voltage and the second received current or (ii) to calculate a second electrical property of the slurry 4 upstream of the retention screen 9 in the first flow direction A based on a second difference between the second supplied current and the second received voltage, whichever data is available.

The data processor device 12 is configured to calculate the adsorption particle content of the slurry 4 upstream of the retention screen 9 in the first flow direction A based on a difference between the first electrical property and the second electrical property.

In an embodiment of the system, the data processor device 12 is functionally connected to a source 13 of adsorption particles 6, and the data processor device 12 is configured to control the source 13 of adsorption particles 6 in response to the calculated adsorption particle content. An advantage of this is that the absorption particle content can automatically or manually be adjusted as a result of the calculated adsorption particle content. In this embodiment of the system, the source 13 of adsorption particles 6 is preferably, but not necessarily, in fluid connection with the first adsorption vessel 1 of said plurality of adsorption vessels 1 in the second flow direction B. An advantage of this is that adsorption particles can be fed into all adsorption vessels 1 of said plurality of adsorption vessels 1 arranged in series from one source 13 of adsorption particles 6. It is also possible that a source 13 of adsorption particles 6 is in fluid connection with more than one or all adsorption vessels 1 of said plurality of adsorption vessels 1.

In an embodiment of the system, the data processor device 12 is functionally connected to the second drive system 26, and the data processor device 12 is configured to control the second drive system 26 in response to the calculated adsorption particle content. An advantage of this is that the absorption particle content can automatically or manually be adjusted as a result of the calculated adsorption particle content by adjusting the flow in the second flow direction B. In this embodiment of the system, the second drive system 26 comprises preferably, but not necessarily, a pump means 23 arranged in the second flow direction B downstream of each absorption vessels 1 of said plurality of adsorption vessels 1 arranged in series, and the data processor device 12 is configured to control at least one pump means 23 of the second drive system 26 in response to the calculated adsorption particle content.

In an embodiment of the system, the data processor device 12 is functionally connected to the first drive system 25, and the data processor device 12 is configured to control the first drive system 25 in response to the calculated adsorption particle content. An advantage of this is that the absorption particle content can automatically or manually be adjusted as a result of the calculated adsorption particle content by adjusting the flow in the first flow direction A. In this embodiment of the system, the first drive system 25 comprises preferably, but not necessarily, a lifting pump means 24 arranged in the retention space 17 of each absorption vessels 1 of said plurality of adsorption vessels 1 arranged in series, wherein the lifting pump is configured to move slurry in the first flow direction A towards the first outlet means 1 of each adsorption vessel 1, and the data processor device 12 is configured to control at least one lifting pump means 24 of the first drive system 25 with in response to the calculated adsorption particle content.

The system can, as illustrated in the embodiments shown in FIGS. 7 to 9, comprise a plurality of leaching reactors 14 arranged in series, wherein said plurality of leaching reactors 14 arranged in series are in fluid connection with the first inlet means 3 of the first adsorption vessel 1 of said plurality of adsorption vessels 1 in the first flow direction A. In other words, the system can for example be a so-called carbon-in-leach (CIL) or a resin-in-leach (RIL) system.

The system can comprise a stripping arrangement 15 for stripping precious metal from adsorption particles 6 so that the stripping arrangement 15 for stripping precious metal from adsorption particles 6 is in fluid connection with the first outlet means 7 of the last adsorption vessel 1 of said plurality of adsorption vessels 1 in the second flow direction B and in fluid connection with the second inlet means 5 of the first adsorption vessel 1 of said plurality of adsorption vessels 1 in the second flow direction B.

The system can comprise a slurry treating arrangement 16 for treating slurry 4 containing metal so that the slurry treating arrangement 16 for treating slurry 4 containing metal is in fluid connection with the first outlet means 7 of the last adsorption vessel 1 of said plurality of adsorption vessels 1 in the first flow direction A.

The slurry 4 can contain additionally leaching agent such as cyanide, chloride, thiosulfate, and glycine and, and contain additionally liquid such as water.

The adsorption particles 6 can comprise carbon such as activated carbon and/or ion exchange resin.

The adsorption particles 6 can be suspended in liquid such as in water.

In each adoption vessel 1, the retention screen 9 can extend between a first horizontal level C in the reactor space 2 and a second horizontal level D in the reactor space 2, which second horizontal level D is vertically below the first horizontal level C. In such case, the second electrodes 22 of the second probe 11 are preferably, but not necessarily, arranged below the first horizontal level C. An advantage of this is that the second electrodes will be arranged distanced from the surface of the content in the reactor space 2. Gas such as air in the slurry close to the surface of the slurry in the reactor space 2 causes mistakes in the measuring and/or possible changes of the surface level height causes also mistakes. The second electrodes 22 of the second probe 11 are more preferably arranged below a fifth horizontal level G that is half-way between the first horizontal level C and the second horizontal level D.

The second electrodes 22 of the second probe 11 are preferably, but not necessarily, at a distance from a bottom 18 of the reactor space 2. An advantage of this is that the particle content is greater close to the bottom 18, which leads to mistakes in measuring.

Each adoption vessel 1 comprises preferably, but not necessarily, a mixer 19 in the reactor space 2 so that rotatable mixing means 20 of the mixer 19 are arranged above a third horizontal level E in the reactor space 2, which third horizontal level E is at a distance above a bottom 18 of the reactor space 2. In such case, the second electrodes 22 of the second probe 11 are preferably, but not necessarily, arranged above a fourth horizontal level F that is half-way between the bottom 18 and the third horizontal level E. An advantage of this is that the content is normally not well mixed at the bottom, which leads to mistakes in measuring. The second electrodes 22 of the second probe 11 are more preferably arranged above the third horizontal level E.

The slurry 4 can contain precious metal containing precious metal in dissolved form. Alternatively or additionally the system is configured to dissolve precious metal contained in the slurry 4 containing precious metal to form precious metal in dissolved form.

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. A method for recovery of precious metal, the method comprising:
    arranging a plurality of adsorption vessels in series, wherein each adsorption vessel comprises a reactor space, a closed retention space within the reactor space, a retention screen between the reactor space and the closed retention space, a first inlet configured to feed slurry containing precious metal into the reactor space, a second inlet configured to feed adsorption particles into the reactor space, a first outlet configured to feed slurry containing precious metal from the closed retention space, and a second outlet configured to feed adsorption particles from the reactor space;
    feeding slurry containing precious metal into the reactor space of each adsorption vessel;
    feeding adsorption particles into the reactor space of each adsorption vessel, wherein precious metals are adsorbed into the adsorption particles;
    moving the slurry through the plurality of adsorption vessels with a first drive system in a first flow direction so that the slurry moves through the retention screen in the reactor space of at least one adsorption vessel of the plurality of adsorption vessels into the closed retention space of the at least one adsorption vessel, wherein the adsorption particles cannot pass through the retention screen whereas the slurry passes through the retention screen;
    moving the adsorption particles with a second drive system through the plurality of adsorption vessels in a second flow direction that is opposite the first direction;
    arranging in the at least one adsorption vessel of said plurality of adsorption vessels first electrodes of a first probe in electrical contact with the slurry downstream of the retention screen in the first flow direction;
    a first measurement step for either (i) supplying with first electrodes of the first probe a first supplied voltage to the slurry downstream of the retention screen in the first flow direction and receiving with first electrodes of the first probe a first received current from the slurry downstream of the retention screen in the first flow direction, or (ii) supplying with first electrodes of the first probe a first supplied current to the slurry downstream of the retention screen in the first flow direction and receiving with first electrodes of the first probe a first received voltage from the slurry downstream of the retention screen in the first flow direction;
    arranging in the at least one adsorption vessel of the plurality of adsorption vessels second electrodes of a second probe in electrical contact with the slurry upstream of the retention screen in the first flow direction;
    a second measurement step for either (i) supplying with the second electrodes of the second probe a second supplied voltage to the slurry upstream of the retention screen in the first flow direction and receiving with the second electrodes of the second probe a second received current from the slurry upstream of the retention screen in the first flow direction, or (ii) supplying with the second electrodes of the second probe a second supplied current to the slurry upstream of the retention screen in the first flow direction and receiving with the second electrodes of the second probe a second received voltage from the slurry upstream of the retention screen in the first flow direction;
    functionally connecting a data processor device with the first probe and with the second probe;
    calculating with the data processor device a first electrical property of the slurry downstream of the retention screen in the first flow direction either (i) based on a first difference between the first supplied current and the first received voltage, or (ii) based on a first difference between the first supplied voltage and the first received current;
    calculating with the data processor device a second electrical property of the slurry upstream of the retention screen in the first flow direction either (i) based on a second difference between the second supplied current and the second received voltage, or (ii) based on a second difference between the second supplied voltage and the second received current;
    by calculating with the data processor device the adsorption particle content of the slurry upstream of the retention screen in the first flow direction based on a difference between the first electrical property and the second electrical property;
    connecting the data processor device to a source of adsorption particles; and
    controlling the source of adsorption particles with the data processor device in response to the calculated adsorption particle content.

2. The method according to claim 1, further comprising the steps of:
    connecting the data processor device to the second drive system; and
    controlling the second drive system with the data processor device in response to the calculated adsorption particle content.

3. The method according to claim 1, further comprising the steps of:
    connecting the data processor device to the first drive system; and
    controlling the first drive system with the data processor device in response to the calculated adsorption particle content.

4. The method according to claim 1, further comprising the steps of:
    arranging a plurality of leaching reactors in series;
    connecting the plurality of leaching reactors arranged in series being in fluid connection with the first inlet of the first adsorption vessel of the plurality of adsorption vessels in the first flow direction; and
    feeding slurry containing precious metal with the plurality of leaching reactors arranged in series into the reactor space of the first adsorption vessel of said plurality of adsorption vessels in the first flow direction.

5. The method according to claim 1, further comprising the steps of:
    providing a stripping arrangement for stripping precious metal from adsorption particles; and
    connecting the stripping arrangement for stripping precious metal from adsorption particles in fluid connection with the first outlet of the last adsorption vessel of the plurality of adsorption vessels in the second flow direction and in fluid connection with the second inlet of the first adsorption vessel of the plurality of adsorption vessels in the second flow direction.

6. The method according to claim 1, further comprising the steps of:
extending the retention screen a first horizontal level in the reactor space and a second horizontal level in the reactor space, which second horizontal level is vertically below the first horizontal level; and
arranging the second electrodes of the second probe below the first horizontal level.

7. The method according to claim 1, further comprising the steps of:
arranging a rotatable mixing means of a mixer above a third horizontal level in the reactor space, which third horizontal level is at a distance above a bottom of the reactor space; and
arranging the second electrodes of the second probe above a fourth horizontal level that is half-way between the bottom and the third horizontal level.

8. The method according to claim 1, further comprising the steps of:
continuously supplying the first supplied voltage or the first supplied current and continuously receiving the first received voltage or the first received current in the first measurement step for a time period between 10 s and 5 min.

9. The method according to claim 1, further comprising the steps of:
continuously supplying the second supplied voltage or second supplied current and continuously receiving the second received voltage or second received current in the second measurement step for a time period between 10 s and 5 min.

10. A system for recovery of precious metal, the system comprising:
a plurality of adsorption vessels arranged in series, wherein each adsorption vessel comprises a reactor space, a closed retention space within the reactor space, a retention screen between the reactor space and the closed retention space, a first inlet configured to feed slurry containing precious metal into the reactor space, a second inlet configured to feed adsorption particles into the reactor space, a first outlet configured to feed slurry containing precious metal from the closed retention space, and a second outlet configured to feed adsorption particles from the reactor space;
slurry containing precious metal in the reactor space of each adsorption vessel;
adsorption particles in the reactor space of each adsorption vessel, wherein the precious metals are adsorbed onto the adsorption particles;
a first drive system for moving the slurry through the plurality of adsorption vessels in a first flow direction so that the slurry moves through the retention screen in the reactor space of each adsorption vessel, wherein the adsorption particles cannot pass through the retention screen whereas the slurry passes through the retention screen;
a second drive system for moving the adsorption particles through the plurality of adsorption vessels in a second flow direction that is opposite the first direction;
wherein at least one adsorption vessel of the plurality of adsorption vessels first electrodes of a first probe in electrical contact with the slurry downstream of the retention screen in the first flow direction, wherein the first electrodes of the first probe are either (i) configured to supply a first supplied voltage to the slurry downstream of the retention screen in the first flow direction, and configured to receive a first received current from the slurry downstream of the retention screen in the first flow direction or (ii) configured to supply a first supplied current to the slurry downstream of the retention screen in the first flow direction, and configured to receive a first received voltage from the slurry downstream of the retention screen in the first flow direction;
wherein the at least one adsorption vessel of the plurality of adsorption vessels second electrodes of a second probe in electrical contact with the slurry upstream of the retention screen in the first flow direction, wherein the second electrodes of the second probe are either (i) configured to supply a second supplied voltage to the slurry upstream of the retention screen in the first flow direction, and configured to receive a second received current from the slurry upstream of the retention screen in the first flow direction or (ii) configured to supply a second supplied current to the slurry upstream of the retention screen in the first flow direction, and configured to receive a second received voltage from the slurry upstream of the retention screen in the first flow direction;
a data processor device functionally connected with the first probe and with the second probe,
the data processor device being configured either (i) to calculate a first electrical property of the slurry downstream of the retention screen in the first flow direction based on a first difference between the first supplied voltage and the first received current or (ii) to calculate a first electrical property of the slurry downstream of the retention screen in the first flow direction based on a first difference between the first supplied current and the first received voltage,
the data processor device being configured either (i) to calculate a second electrical property of the slurry upstream of the retention screen in the first flow direction based on a second difference between the second supplied voltage and the second received current or (ii) to calculate a second electrical property of the slurry upstream of the retention screen in the first flow direction based on a second difference between the second supplied current and the second received voltage,
the data processor device being configured to calculate the adsorption particle content of the slurry upstream of the retention screen in the first flow direction based on a difference between the first electrical property and the second electrical property; and
wherein the data processor device is connected to a source of adsorption particles, and the data processor device is configured to control the source of adsorption particles in response to the calculated adsorption particle content.

11. The system according to claim 10, wherein the data processor device is functionally connected to the second drive system, and the data processor device is configured to control the second drive system in response to the calculated adsorption particle content.

12. The system according to claim 10, wherein the data processor device is functionally connected to the first drive system, and the data processor device is configured to control the first drive system in response to the calculated adsorption particle content.

13. The system according to claim 10, further comprising:

a plurality of leaching reactors arranged in series, wherein the plurality of leaching reactors is arranged in series being in fluid connection with the first inlet of the first adsorption vessel of the plurality of adsorption vessels in the first flow direction.

14. The system according to claim 10, further comprising:

a stripping arrangement for stripping precious metal from adsorption particles, wherein the stripping arrangement for stripping precious metal from adsorption particles being in fluid communication with the first outlet of the last adsorption vessel of the plurality of adsorption vessels in the second flow direction and in fluid connection with the second inlet of the first adsorption vessel of the plurality of adsorption vessels in the second flow direction.

15. The system according to claim 10, further comprising:

a slurry treating arrangement for treating slurry containing metal, wherein the slurry treating arrangement for treating slurry containing metal is in fluid connection with the first outlet of the last adsorption vessel of the plurality of adsorption vessels in the first flow direction.

16. The system according to claim 10, wherein the retention screen extends between a first horizontal level in the reactor space and a second horizontal level in the reactor space, wherein the second horizontal level is vertically below the first horizontal level, and the second electrodes of the second probe are arranged below the first horizontal level.

17. The system according to claim 10, wherein the second electrodes of the second probe are arranged at a distance from a bottom of the reactor space.

18. The system according to claim 10, further comprising:

a mixer in the reactor space, rotatable mixing means of the mixer being arranged above a third horizontal level in the reactor space, which wherein the horizontal level is at a distance above a bottom of the reactor space, wherein the second electrodes of the second probe are arranged above a fourth horizontal level that is halfway between the bottom and the third horizontal level.

* * * * *